(12) United States Patent
Stokes et al.

(10) Patent No.: US 7,369,062 B2
(45) Date of Patent: May 6, 2008

(54) NETWORKED COMMUNICATION DEVICES

(75) Inventors: Peter David Stokes, Dereham (GB); Daniel Leach, Buckden (GB); Stephen John Braithwaite, Southampton (GB)

(73) Assignee: Saf-T-Glo Limited, Norfolk (GB)

( * ) Notice: Subject to any disclaimer, the term of this patent is extended or adjusted under 35 U.S.C. 154(b) by 238 days.

(21) Appl. No.: 10/520,892

(22) PCT Filed: Jul. 10, 2003

(86) PCT No.: PCT/GB03/03006

§ 371 (c)(1),
(2), (4) Date: Sep. 16, 2005

(87) PCT Pub. No.: WO2004/008261

PCT Pub. Date: Jan. 22, 2004

(65) Prior Publication Data
US 2006/0111793 A1 May 25, 2006

(30) Foreign Application Priority Data

Jul. 10, 2002 (GB) .................................. 0215924.2
Mar. 1, 2003 (GB) .................................. 0304748.7
Mar. 18, 2003 (GB) .................................. 0306095.1

(51) Int. Cl.
*G08B 21/00* (2006.01)
(52) U.S. Cl. ................. 340/945; 340/953; 702/182
(58) Field of Classification Search ........... 340/945, 340/321, 332, 952, 953, 539.1; 455/420; 702/182
See application file for complete search history.

(56) References Cited

U.S. PATENT DOCUMENTS 5,907,491 A * 5/1999 Canada et al. ............... 702/182

(Continued)

FOREIGN PATENT DOCUMENTS

DE 41 34 034 A1 7/1992

OTHER PUBLICATIONS

Robert M. Harman, "Wireless Solutions for Aircraft Condition Based Maintenance Systems", 2002 IEEE Aerospace Conference Proceedings, vol. 6, Mar. 9-16, 2002, pp. 2877-2886.
Richard Alena et al., "Modeling a Wireless Network for International Space Station", 2000 IEEE Aerospace Conference Proceedings, vol. 11, Mar. 18-25, 2000, pp. 223-228.

(Continued)

Primary Examiner—John Tweel, Jr.
(74) Attorney, Agent, or Firm—Greer, Burns & Crain, Ltd.

(57) ABSTRACT

An aircraft emergency lighting system includes a plurality of light units arranged to guide passengers to and to identify exits in an emergency. The light units communicate wirelessly with a remote master control unit operable from the cockpit using a low power spread spectrum signal centered on a single frequency to avoid interference with onboard aircraft control and communication systems. The light units are arranged to receive and transmit any signal to and from the master controller whereby only some of the light units need be within range of the master controller. The light units include battery operated LEDs and cycle between an inoperable (sleep) condition and an operable (awake) condition to conserve power consumption and extend battery life.

20 Claims, 4 Drawing Sheets

U.S. PATENT DOCUMENTS

| | | | | |
|---|---|---|---|---|
| 6,006,158 | A | * | 12/1999 | Pilley et al. ................ 340/953 |
| 6,167,238 | A | * | 12/2000 | Wright ....................... 340/945 |
| 2001/0055965 | A1 | * | 12/2001 | Delp et al. .................. 340/539 |
| 2002/0044042 | A1 | * | 4/2002 | Christensen et al. ....... 340/3.54 |
| 2002/0080027 | A1 | * | 6/2002 | Conley, III ................ 340/540 |

OTHER PUBLICATIONS

Jaap Haartsen, "Bluetooth—The universal radio interface for *ad hoc*, wireless connectivity", Ericsson Review, Online! No. 3, 1998, pp. 110-117, <URL:http://www.ericsson.com/about/publications/review/1998_03/14.shtml>.

* cited by examiner

NETWORKED COMMUNICATION DEVICES

This application is a §371 National Phase based on PCT/GB03/003006 filed Jul. 10, 2003.

BACKGROUND

This invention concerns improvements in or relating to networked communication devices and systems employing such networked devices. The invention has particular, but not exclusive application to systems in which a plurality of networked communication devices such as transceivers are arranged to communicate wirelessly with a master controller to control operation of the devices and/or to provide information relating to the status of the devices. More especially, the invention relates to systems employing spread spectrum communication between networked communication devices and a master controller. The invention may be employed in aircraft to control operation of safety systems in an emergency such as emergency lighting systems to assist evacuation of the aircraft, for example in the event of an accident, or deployment of oxygen masks, for example following sudden de-pressurisation of the cabin. The invention may also be employed to provide information on the status of such systems and/or information relating to other systems relating to safety of the aircraft, for example smoke detection systems.

Conventional electrically powered lighting systems provided in aircraft for normal use are hard wired with electrical wiring connecting individual light sources to a remote power source, typically storage batteries. Such systems may be rendered inoperable following an accident if the electrical wiring connections to the power source are damaged. For example, the electrical wiring connections may be broken by impact damage to the structure of the aircraft, and/or by fire and/or by water if the aircraft has to make an emergency landing on land or in the sea.

For this reason, it is a mandatory requirement to fit aircraft with emergency lighting systems at ceiling and floor level that are operable independently of the normal lighting system to provide back-up in the event of failure of the latter and to assist evacuation of the aircraft.

Traditionally, these emergency lighting systems have also been electrically powered with hard wiring connecting the light sources to a remote power source such as storage batteries separate from the electrical lighting system for normal use. This adds considerably to the installation costs.

Furthermore, being electrically powered, these known emergency lighting systems have been susceptible to failure at the time they are required. For example, damage to the power source (e.g. storage batteries) and/or the electrical wiring connections may prevent operation of the emergency lighting system in exactly the same way that the overhead electrical lighting systems for normal use may be rendered inoperable.

Another disadvantage of electrically powered emergency lighting systems is the additional servicing and maintenance work that has to be carried out to keep the system in good condition. Thus, the power source, electrical wiring, connections and light source such as bulbs have to be checked regularly and any damaged or broken parts replaced.

We have previously proposed in European Patent No.0828657-B1 a floor mounted emergency lighting system employing photoluminescent material arranged in a track extending along one or both sides of the aisle. The photoluminescent material is operable to emit light automatically to identify an escape route at low levels of illumination, for example if the normal overhead lighting is inoperable following a crash.

More particularly, the photoluminescent material is activated by exposure to a light source such as ambient light or the normal overhead lighting and releases light by means of the stored energy from such activation. In this way, the photoluminescent material is self-illuminating to identify an escape route for guiding passengers to an emergency exit at the time it is needed without any connections to a separate power source such as storage batteries required by conventional electrically powered emergency lighting systems.

Furthermore, the emission of light by the photoluminescent material is unaffected by damage to the track(s) and the emergency lighting system continues to operate even if the aircraft breaks up into several parts. As a result, the track(s) identify an escape route which passengers can follow to an exit or to an opening in the body of the aircraft to escape in an emergency.

This system has been widely adopted with success by many aircraft operators. However, to comply with current regulations, electrically powered vertical exit identifiers (VEIs) have to be provided to identify the exits below 48". These require hard wiring connections to a remote power source (storage batteries) and may therefore be inoperable if the wiring connections are damaged.

Similar problems exist with other safety systems typically provided in aircraft that rely on hard wiring connections to an electrical power source to operate in an emergency. For example, drop-down oxygen masks provided in the cabin to allow the passengers to breathe if the cabin suddenly de-pressurises are electrically operable and may be rendered inoperable if the cause of the de-pressurisation also damages the hard wiring connections.

Accordingly, the problems and disadvantages of electrically powered hard wired safety systems on aircraft remain.

The present invention has been made from a consideration of the aforementioned problems and disadvantages of existing hard wired electrical safety systems used in aircraft.

Thus, it is a desired aim of this invention to provide further improvements in safety systems employed on aircraft.

SUMMARY

In particular, it is preferred object of the present invention to provide safety systems that enable the amount of hard wiring required to install such systems to be reduced or eliminated whereby reliable operation in an emergency may be enhanced.

More especially, it is a desired object of the present invention to provide a wireless lighting system, especially a wireless emergency lighting system for use in situations where rapid evacuation is critical to safety of passengers such as in an aircraft, ship, train or coach following an accident.

It is a preferred object of the present invention to provide a wireless emergency lighting system that is operable independently of electrical connections to a remote power source.

These and other objects and advantages of the invention in its various aspects are described in more detail hereinafter.

According to a first aspect of the invention there is provided a system for a vehicle such as an aircraft comprising a plurality of networked communication devices arranged to communicate wirelessly with a master controller using spread spectrum communication to control operation of the devices and/or to provide information relating to the status of the devices.

By employing spread spectrum communication there is no need for a physical electrical connection between the devices and the master controller. Furthermore, as the devices and master controller communicate using spread spectrum technology the likelihood of the signal interfering with other vital vehicle systems is extremely low. Spread spectrum communication is also less susceptible to interference from external sources compared to narrow band communication.

In one arrangement the spread spectrum communication is frequency hopping, for example bluetooth. In a different arrangement, the spread spectrum communication is direct sequencing. Preferably, the devices and master controller employ transceivers (combined transmitter and receiver) that communicate using radio transmission.

The master controller may be capable of transmitting and receiving signals to and from each device independently of the other devices, i.e. all the devices may be within the range of the master controller. For some applications, however, especially in aircraft where the shell of the aircraft body, seating within the cabin, bulkheads and other structures provide considerable interference to the transmission and reception of the signals, it may be desirable to arrange the devices so that signals to and from the master controller are cascaded between the devices.

In this way, devices outside the range of the master controller can receive signals from and transmit signals to the master controller via one or more devices within the range of the master controller. Such cascading may permit the use of signals of low strength which reduce the risk of interference with other electrical systems of the aircraft that may cause malfunction of essential systems and lead to an increased risk of an accident. This is especially important during landing and take-off where any malfunction may cause the aircraft to crash.

The devices may be arranged in groups with at least one device in each group acting as a hub to receive/transmit signals to and from the other devices in the group and the hub(s) of adjacent group(s) and/or the master controller. In this way, the master controller communicates with the hub of the closest group which communicates with the hub of the next group and so on. As a result, signals are cascaded in both directions in a sequential manner along the aircraft to and from the master controller via the hubs to all the devices.

More preferably, however, all the devices are arranged to receive/transmit any signal. In this way, the master controller can communicate with any device within range which in turn can communicate with any other device within range. As a result, signals are cascaded in both directions in a random manner along the aircraft to and from the master controller and all the devices. Such random communication between the master controller and the devices reduces the risk of any signal to or from the master controller being terminated prematurely if any device is inoperable for any reason.

Preferably, each device is provided with its own power source, for example a battery. The battery may be replaceable, for example a lithium battery. Alternatively, the battery may be rechargeable. For example, we may provide each device with a re-chargeable battery and a photovoltaic cell to charge the battery. The re-chargeable battery and photovoltaic cell may be of any suitable type. For example we may use a nickel metal hydride or lithium re-chargeable battery and a photovoltaic cell based on silicon (Si) or gallium arsenide (GaAs) technology. In this way, routine battery replacement is not required.

Each device may include a charging circuit to control operation of the photovoltaic cell to charge the battery according to requirements. For example, the photovoltaic cell may be operable to re-charge the battery if the charged level of the battery drops below a pre-determined limit. Re-charging may be controlled in response to the charged level of the battery. Each device may provide a visual and/or audible warning of failure of the battery and/or the photovoltaic cell.

Advantageously, the system is adapted to conserve battery power and thereby extend the period of time between battery re-charging and/or battery replacements. One way in which the battery life may be extended is to arrange for the devices to cycle between an operable (awake) condition in which it can receive/transmit a signal and an inoperable (sleep) condition in which it does not receive/transmit a signal.

By arranging the listening time when the device is awake to be relatively short, for example of the order of a few milliseconds, we have found that we can greatly increase the useful life of the battery without significantly affecting the response of the system.

Thus, if all the devices are cycling between the operable and inoperable conditions in a random manner, then at any given time, at least some of the devices will be operable while others are inoperable and any signal transmitted by the master controller will be picked up and re-transmitted by any device within range that is operable. In this way the signal will be cascaded in a random manner between the devices according to when they become operable within range of the master controller or a device that has already received and is re-transmitting the signal.

In some embodiments we may provide two cycle modes with different intervals between the operable and inoperable conditions. A longer cycle time may be provided in a stand-by mode of operation where the system is not in regular use and it is not necessary for the devices to be rapidly cycling between the operable and inoperable conditions, and a shorter cycle time in an armed mode of operation where the system may be required to respond to a signal from the master controller in an emergency.

For example, we may provide a cycle time of 2.5 seconds in the armed mode and a cycle time of 10 seconds in the stand-by mode. Where the system is in regular use, for example on aircraft that are turned around and back in use within a short period of time, the devices may be left in the armed mode and the stand-by mode only selected if the aircraft is out of service for an appreciable time between flights.

Preferably, each device is provided with a unique identification code and the master controller can transmit a polling signal that requires each device to transmit its unique identification code. In this way, the system can be checked to determine if any devices are inoperable by transmitting the polling signal and checking if identification codes are not received from any device(s). Depending on the system, the aircraft may still be cleared for take-off if some of the devices are inoperable provided a minimum number are still operable. Typically, the identification codes are generated during initial set-up of the system.

Advantageously, each device is operable to carry out a "health" and "status" check in response to a test signal from the master controller and transmit a signal to indicate if the device is operational. The master controller may generate a pass/fail signal to indicate if the system is operational.

The invention may be applied to various safety systems on an aircraft. For example, the networked devices may comprise light units of an emergency lighting system to guide passengers to and to identify the exits in an emergency. For example, the lights units may be located at or near ground level on one or both sides of the aircraft aisle(s) and/or on either side of the exits. Alternatively, or additionally, the light units may be located at or near ceiling height on one or both sides of the aircraft aisle(s).

Each light unit may comprise a light source such as a light emitting diode (LED). LEDs are preferred for their low power consumption and reliability. In a preferred arrangement, the light source comprises an array of LEDs, in particular white LEDs, to provide sufficient illumination with low power requirement.

Where the light unit is provided at an exit it may comprise a sign such as a vertical exit identifier to identify the exit with the light source being operable to illuminate the sign and, preferably also, to illuminate an area adjacent to the sign. Where the light unit is provided to guide passengers to an exit it may comprise a progression sign such as an arrow to indicate the direction to an exit.

In this way, aircraft emergency lighting systems may be provided free from hard wiring connections to a remote power source (storage batteries). As a result, operation of the lighting system in an emergency is not dependent on the integrity of wiring connections and each light unit can operate independently of any other unit to provide an indication of an escape route and/or an exit if the aircraft suffers structural damage. For example, if the aircraft body separates as a result of impact forces in a crash landing, the light units on each separate part may still be operational. Thus, the light units will normally have been switched on when an emergency condition occurred and will remain on if subsequent damage to the aircraft occurs.

According to a second aspect of the invention there is provided an aircraft comprising an emergency lighting system employing a plurality of networked light units arranged to communicate wirelessly with a master controller using spread spectrum communication to control operation of the light units and/or to provide information relating to the status of the light units.

The lighting system may be operable in an emergency to guide passengers to an exit. For example, the lighting means may comprise one or more of exit identifiers, direction indicators, escape path markers or overhead lighting. The exit identifiers may comprise signs placed at the exits to identify where the exits are. The direction indicators may comprise arrows arranged to indicate the direction to the exits. The escape path markers may comprise light units positioned at or near floor level along one or both sides of an aisle along which passengers can move to an exit.

According to a third aspect of the invention there is provided a control system for an emergency lighting system comprising a master controller including a transmitter for transmitting a spread spectrum signal, and a plurality of light units including a respective lighting means and a respective receiver responsive to the spread spectrum signal for controlling operation of the associated lighting means.

Preferably, each light unit includes a respective transmitter for transmitting a broadcast signal from the master controller and/or from another light unit and the master controller includes a receiver for receiving broadcast signals from the light units. In this way, the light units can talk to each other and to the master controller directly or indirectly via another light unit. In this way, the operation of the system is not dependent on all the light units being within range of the master controller.

According to a fourth aspect of the invention there is provided an emergency lighting system comprising a transmitter operable to emit a spread spectrum signal and a receiver responsive to the spread spectrum signal for controlling operation of lighting means.

Preferably, the transmitter is provided by a master controller and the lighting means comprises a plurality of light units each having a receiver and a transmitter. In this way, the broadcast spread spectrum signal from the master controller can be cascaded between the light units and operation of the system is not dependent on all the light units being within range of the master controller.

Advantageously, the master controller also includes a receiver. In this way, the master controller can receive spread spectrum signals broadcast from the light units, for example for checking the status of the light units.

According to a fifth aspect of the invention there is provided a method of operating an emergency lighting system comprising providing a transmitter operable to emit a spread spectrum signal and a receiver responsive to the spread spectrum signal for controlling operation of lighting means.

Preferably, the lighting means comprises a plurality of light units each capable of receiving and transmitting a spread spectrum signal and the method further comprises cascading the broadcast spread spectrum signal from the transmitter between light units of the lighting means. In this way, the operation of the system is not dependent on all the light units being within range of the master controller.

It will be understood that the invention is not restricted to lighting systems and has wider application to other safety systems that may be employed in aircraft and/or may be used to control/monitor other onboard equipment. For example, the system may be used to control deployment of drop-down oxygen masks in an emergency. Alternatively, the system may be used to monitor smoke alarms or other equipment to provide an indication of the status of the condition of the aircraft or any essential equipment. It will also be appreciated that the invention may have application in locations other than aircraft.

According to a sixth aspect of the invention there is provided a wireless control system for a plurality of units wherein each unit communicates with a master control unit using spread spectrum communication and is capable of receiving a signal and transmitting the same signal whereby a signal initially broadcast by the master control unit can be passed on to units outside the range of the master control unit.

One or more units may include a light that is switched on by a first signal broadcast from the master control unit and is switched off by a second signal broadcast from the master control unit or by the absence of either signal after a pre-determined time. One or more units may comprise an alternative function such as a smoke alarm or a drop down oxygen mask.

BRIEF DESCRIPTION OF THE DRAWINGS

Other features, benefits and advantages of the invention will be apparent from the following description of exemplary embodiments with reference to the accompanying drawings, in which.

DETAILED DESCRIPTION

Figure 1:
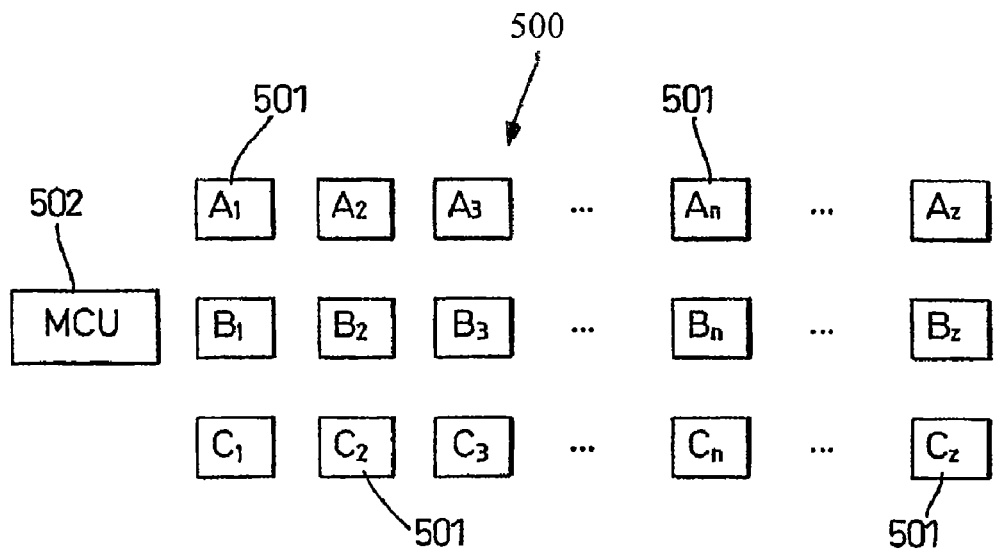
FIG. 1 is a schematic lay-out of a lighting system according to a first embodiment of the invention.
Figure 2:
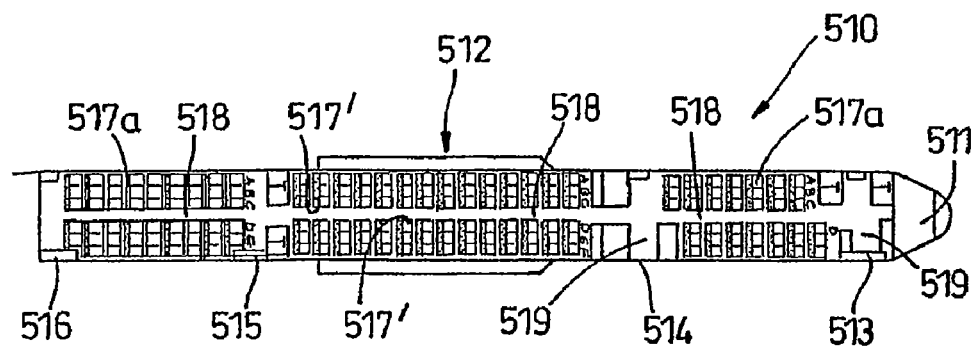
FIG. 2 shows a schematic of the interior of an aircraft to which the lighting system of FIG. 1 may be applied.

Referring first to FIGS. 1 and 2 of the accompanying drawings, there is depicted schematically a lighting system 500 comprising a plurality of light units 501 arranged at an array of locations $A_1 \ldots A_z$, $B_1 \ldots B_z$, $C_1 \ldots C_z \ldots$ for control by a master control unit 502 and an aircraft 510 in which the lighting system 500 may be employed to assist escape in an emergency. While the array of locations is shown in FIG. 1 as a rectangular array, it will be appreciated that the actual array to be used will be governed largely by the geometry of the installation site and any applicable regulations.

The aircraft 510 has a cockpit 511 and a passenger cabin 512. The cabin 512 has a plurality of seats 517 arranged in rows on either side of a central main aisle 518. Branch aisles 519 lead from the main aisle 518 to exits 513, 514, 515, 516. In this embodiment, there are four exits 513, 514, 515, 516 from the cabin 512. Exits 513, 516 at the front and rear of the aircraft allow passengers to get on and off the aircraft 510 in normal use and in an emergency. Exits 514, 515 are provided for use in an emergency only. It will be understood that the number and lay-out of the seats 517, aisles 518, 519 and exits 513, 514, 515, 516 may be altered from that shown.

The light units 501 may be arranged at desired locations in the cabin 512 and the master control unit 502 arranged in the cockpit 511 for operation by the flight crew. For example, locations $A_1 \ldots A_z$, may be at the exits 513, 514, 515, 516 where the light units 501 are vertical exit identifiers (VEI's). Locations $B_1 \ldots B_z$ may be on aisle seats 517' where the light units 501 are mounted at or near floor level on one or both sides of the aisle 518 to provide a floor proximity lighting system to identify a route to the exits 513, 514, 515, 516 in an emergency. Locations $C_1 \ldots C_z$ may be on overhead luggage compartments (not shown) where the light units 501 are mounted above the seats 517 to provide overhead lighting in an emergency. It will be understood, however, that the light units 501 may be arranged at other locations in the aircraft 510 as desired.

While a single master control unit 502 is shown, a second such unit may be provided to allow operation of the light units 501 from more than one location if required. For example, a (primary) master control unit 502 may be provided in the cockpit 511 with an optional (secondary) master control unit 502 located at the rear of the aircraft 510 for operation by cabin staff. Additional (secondary) master control units 502 may be provided at other positions within the aircraft 510 if desired, for example adjacent to exits 513, 514, 515, 516.

The additional (secondary) units may be activated automatically in response to activation of the main (primary) master control unit 502. Alternatively, the main (primary) and additional (secondary) control units may be arranged so that each unit is activated automatically in response to activation of any one of the units. Alternatively or additionally, the additional (secondary) units may be activated manually, for example by switches.

In a modification, the (primary) master control unit 502 may be located in the cabin 512 at the front of the aircraft 510 and connected to a switch (not shown) in the cockpit 511. In this way, shielding of signals transmitted to and from the (primary) master control unit 502 by the bulkhead separating the cabin 512 from the cockpit 511 may be avoided. The master control unit 502 may include a master switch on a membrane panel to over-ride the cockpit switch.

This arrangement is suitable for both new build and retrofit installation of the emergency lighting system 500 in aircraft. Thus, when replacing an existing hard wired system, the (primary) master control unit 502 may be connected to an existing switch in the cockpit 511 for operating the original emergency lighting system. The light units 501 may be installed in place of the existing emergency lights. Alternatively, the light units 501 may be modified for connection to the existing emergency lights, for example by replacing a light source within the light units 501 with a connector for coupling to an existing light.

In this way, a hard wired emergency lighting system can be replaced with a wireless system during a re-fit with minimum disruption to the layout of the existing emergency lighting system. Thus, each light source of the existing emergency lighting system (both internal and external) may be connected to a modified light unit 501 permitting wireless control via a master control unit 502.

Figure 3:
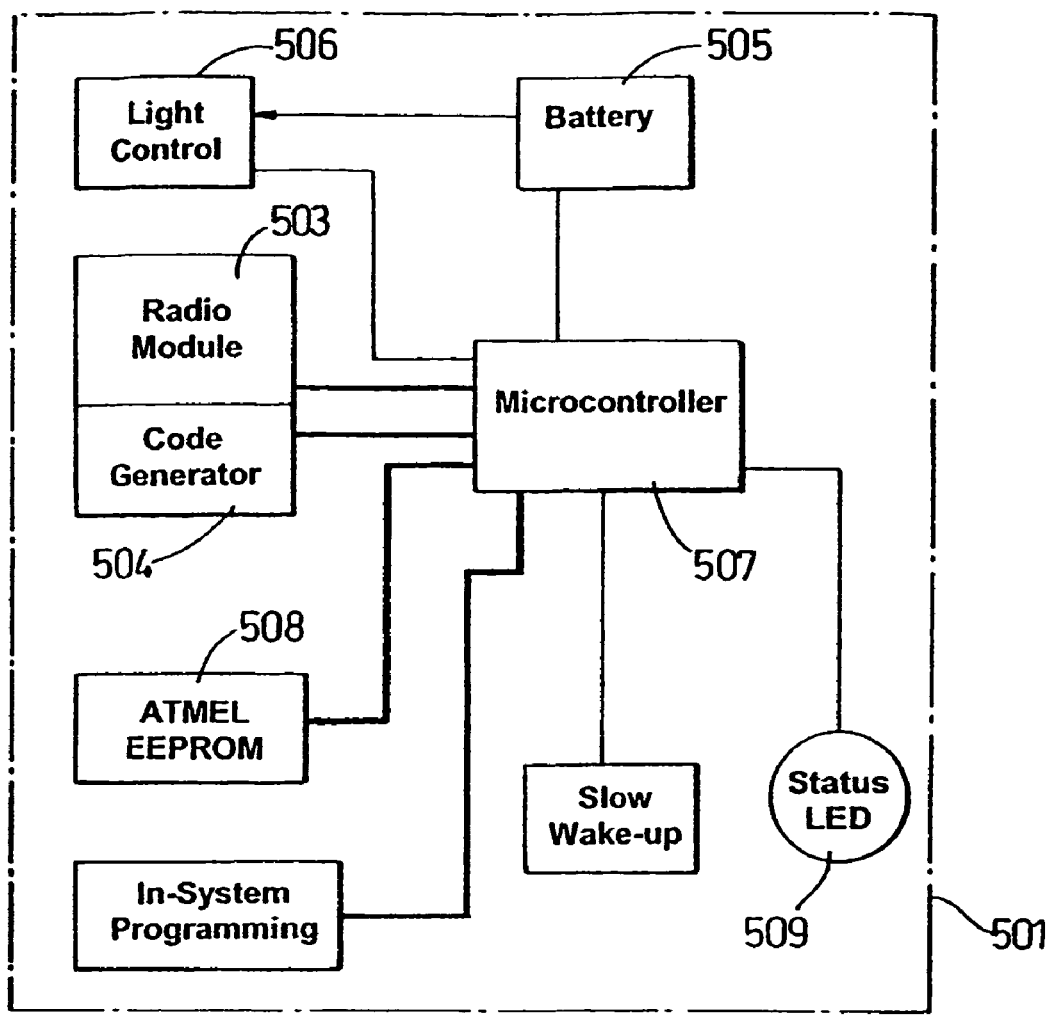
FIG. 3 is a block diagram illustrating component parts of a light unit of the lighting system of FIG. 1.

Referring now to FIG. 3, each light unit 501 is similar and comprises a mother board including radio module (transceiver) 503 for receiving and transmitting spread spectrum signals and a code generator 504 for modulating such signals.

The code generator 504 generates a code division multiple access (CDMA) spreading sequence code with random code offsets that protect against co-channel interference causing a failure to receive where a module 503 receives two or more similar power signals carrying the same message.

The light unit 501 further comprises a battery 505, a light control 506, a contactless reader 508, a status LED 509 and a microcontroller 507 for controlling operation of the unit 501.

The battery 505 provides the power source for the functions of the light unit 501. The battery 505 is detachable for removal and replacement with a new battery when required. The light control 506 controls operation of a light source described later to provide illumination when the light unit 501 is switched on in response to an appropriate on-signal broadcast from the master control unit 502.

The light unit 501 may be switched-off in response to an appropriate off-signal broadcast from the master control unit 502. Alternatively, the light unit 501 may be switched off automatically a pre-determined time after being switched on in the absence of an on-signal broadcast from the master control unit 502.

The reader 508 may employ a very short range low power radio signal and be used to carry out programming of the microcontroller 507 and/or for fault analysis if the light unit 501 malfunctions. This may assist repair of the unit 501 if required. The status LED 509 provides a visual indication of the health of the unit 501. For example, the LED 509 may be illuminated to indicate the unit 501 is operational. In this way, an inspection of each unit 501 can be made to locate any faulty units 501.

Each light unit 501 is arranged to conserve battery life. For example, the unit may cycle between a state in which it is "asleep" and does not respond to signals broadcast from the master control unit 502 and a state in which it is "awake" and capable of listening for and responding to a signal broadcast from the master control unit. The unit 501 may be arranged to be "awake" for very short periods of time, for example a few milliseconds, and to be "asleep" for longer periods of time, for example several seconds.

The unit may be arranged to operate with a longer duty cycle in a "stand-by" mode in which it is awakened every 10 seconds, or with a shorter duty cycle in an "armed" mode in which it is awakened every 2.5 seconds. It will be appreciated that these time periods are merely exemplary and they may be shorter or longer as desired. Stand-by mode is appropriate when an aircraft 510 is not in use with armed mode being selected when the aircraft 510 is ready for boarding by passengers.

For long periods of non-use such switching between stand-by and armed modes may reduce power consumption and extend battery life. In some applications, however, where the aircraft 510 is in regular use the stand-by mode may be omitted or simply not selected. We believe that reductions in power consumption by avoiding regular switching between different modes, for example between stand-by and armed modes, may exceed any savings provided by using the stand-by mode leading to an improvement in battery life. Furthermore, employing one mode only eliminates any differences due to use and non-use and may enable battery life to be controlled in a more predictable, reliable manner substantially independent of the operational duty cycle such that battery replacement can be carried out at regular intervals, for example during routine servicing.

The radio module 503 of each light unit 501 is arranged to receive a spread spectrum signal originally broadcast by the master control unit 502, and to retransmit that signal. In this way, not all of the units 501 have to be within range of the master control unit 502 as units 501 that are outside the range of the master control unit 502 will eventually receive the retransmitted signal from one of the other units 501. As a result, a low power signal having a limited range can be used and transmitted in cascade manner throughout an aircraft to reach a light unit at each of the array of locations.

As will be appreciated, the light units 501 receive and re-transmit any broadcast signal from the master control unit 502 or from another light unit when they are awake and the time taken for all light units to receive the signal will depend on duty cycle of the units 501. Thus, it will take longer in the stand-by mode for the signal to reach all light units 501 than in the armed mode. This is not considered to cause any problem as the stand-by mode is only intended to be used when the aircraft 510 is not in use, for example when grounded between flights, and the armed mode will be selected when the aircraft 510 is in service.

The use of low power spread spectrum signals is beneficial in achieving long battery life and low risk of interference with other systems in the aircraft 510. It also avoids or greatly reduces any risk of activating a similar system installed on any nearby aircraft, for example during maintenance testing when the aircraft 510 is on the ground, or interfering with any signals transmitted to and from the aircraft. For example, we have found that a spread spectrum signal centred on a single frequency above or below the 345 MHz frequency that is used as standard by landing beacons can be employed and avoids interference with other aircraft systems. In particular, a low power signal centred on a frequency of 310 MHz or 315 MHz may be used with a power density of less than 1 microwatt. It will be understood, however, that a spread spectrum signal centred on other frequencies with other power densities may be employed as desired.

As will now be appreciated, the above described control system has high redundancy, since each light unit may be within transmission range of several other units, a signal will be received and re-transmitted in a random manner when a light unit is awake. The use of CDMA ensures co-channel interference does not occur to cause failure of a light unit to receive the signal. In this way, the need for synchronisation of the duty cycles or timed multiple transmissions of signals that would complicate the system and increase the time required to activate all the light units is avoided. As a result, it is not necessary for all light units to be awake at the same time and failure of one or a few units will have little overall effect on operation of the system, simply a lack of illumination from the failed units.

Figure 4:
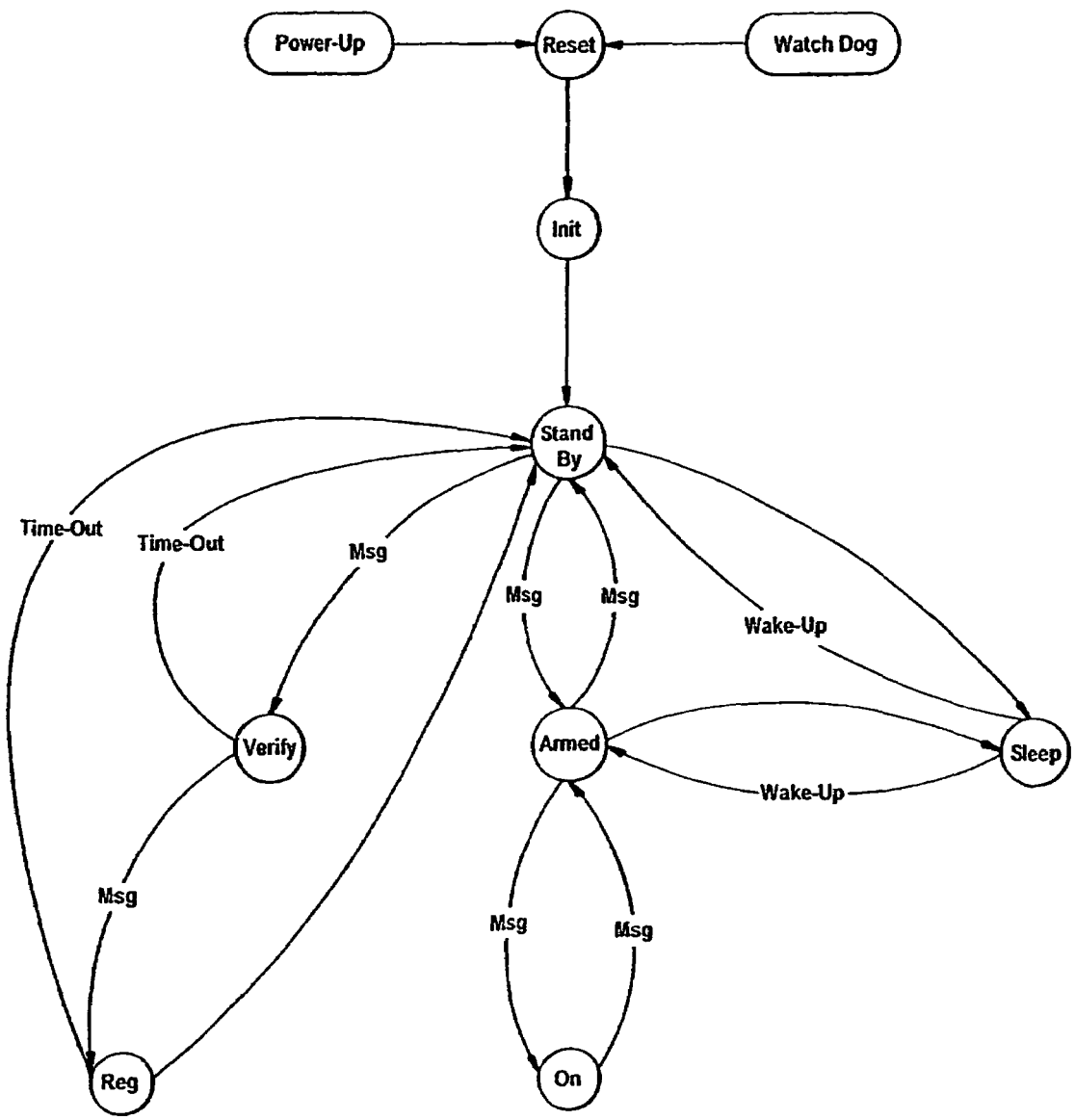
FIG. 4 is a schematic lay-out of the operating functions of the light unit shown in FIG. 3.

The operating functions of the lighting systems 500 will now be described in more detail with additional reference to FIG. 4. On installation of the system 500, an initialisation signal may be broadcast by the master control unit 502. This will be received by neighbouring light units 501 initially in stand-by mode, and retransmitted. When a light unit 501 receives such an initialisation signal it will generate a unique identification signal and transmit that as well. Eventually, such identification signal will return to the master control unit 502 which responds by sending back an acknowledgement and a unique registration code for registration of the light unit 501.

A polling signal may be broadcast by the master control unit 502 to allow routine checking of the light units 501 to be carried out, for example on a daily basis, for maintenance purposes. Plainly lack of response from any particular light unit 501 will indicate its failure. The time taken for these one-off or routine operations will clearly depend on the duty cycle in stand-by mode. This is not an emergency operation and a balance has to be achieved between convenience and long battery life. We have found that a suitable compromise is achieved with a wake/sleep cycle of about 10 seconds.

During flight preparation, flight crew may cause the master control unit 502 to send out an arming signal to bring each light unit 501 into the armed mode with a shorter duty cycle, or this may be arranged to occur automatically on initiation of some other flight-preparatory operation. Again, activation into the armed mode may take some time, but this can proceed while the flight crew are attending to other duties and it is not envisaged that any delay will be caused.

The wake/sleep cycle while in armed mode will govern the response time of the system in an emergency situation. We have found that computer simulations predict that for tested arrangements with a wake/sleep cycle of 2.5 sec and a wake time of about 3 ms in the armed mode, at least 50% of the light units installed in an aircraft can be switched on within 3.5 seconds.

Thus, for example, in a Boeing 747 with 160-190 units, about 90% of the units are woken up and the emergency light switched on well within 4 sec and the process is completed within 4.6 sec. In a Boeing 737 with 30-40 units, 90% of the units are woken up and the emergency light switched on within 4.5 sec and the process is completed within 5.8 sec. In an Embraer 145 with 22 units, 90% of the units are woken up and the emergency light switched on within 3.5 sec and the process is completed within 4.3 sec.

It is interesting to note that these response times are not dependent on the number of light units involved in any immediately obvious way. We believe that these response times are quite acceptable, but they may be reduced further by reducing the period of the wake/sleep cycle in the armed mode.

The master control unit 502 may comprise the mother board described above for the light units 501 with a daughter board including additional circuitry such as a master control unit interface, a debug interface and hard wiring to a power supply. In this embodiment, all the light units 501 are provided with the same firmware so that, if any unit 501 detects it is connected to a master control unit panel or cabin switch, it will respond to the stimuli accordingly.

The master control unit 502 may provide an indication of the status of each light unit 501. For example, the position of each light unit may be indicated on a screen connected to the master control unit 502 and the position is illuminated in response to a polling signal broadcast by the master control unit if the light unit is operational. In this way any failed unit can be readily identified.

Alternatively, the master control unit 502 may provide an indication of the overall condition of the system. For example a signal may be generated if the response to a polling signal is received from a sufficient number of lights to render the system operational. The master control unit 502 can identify the light units responding to the polling signal and prevent the signal being generated if the number of failed units detected in any area or zone exceeds a predetermined limit.

The master control unit 502 may also control operation of a light to provide illumination in an emergency, i.e. one of the light units 501 may comprise the master control unit 502.

The system may include a capability for on-board diagnostics. Thus, the master control unit 502 may store diagnostic (maintenance) information and have an output connection to a detachable PDA (Personal Digital Assistant) or a laptop or other similar suitable device to download the information when required. Alternatively or additionally, the master control unit 502 may input the information into an onboard aircraft central control unit or system that may provide an output in any suitable form, for example a visual display. The master control unit may even be provided as part of the onboard central control unit or system, for example as original equipment on new build aircraft.

Figure 5:
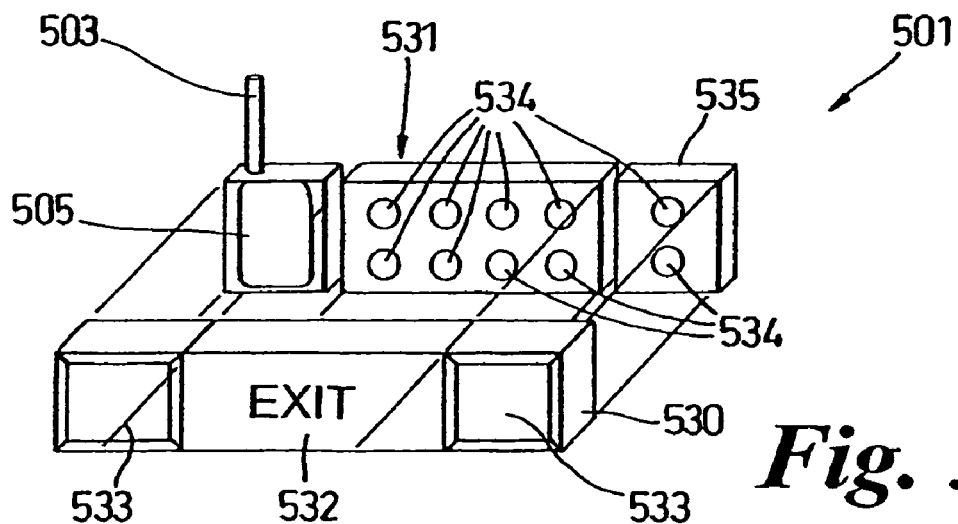
FIG. 5 shows an exploded perspective view of a light unit of the lighting system of FIG. 1.

Referring now to FIG. 5, each light unit 501 positioned at an exit 513, 514, 515, 516 comprises a housing 530 of rectangular shape containing a light source 531 that illuminates an exit sign 532 to identify the exit and also provides general illumination of the area adjacent the exit via white lenses 533 of polycarbonate or other suitable material on either side of the exit sign 532.

The exit sign 532 consists of the word "exit" in a colour contrasting with the background so as to be visible when the light unit 501 is illuminated. The letters may be translucent and the background opaque so that the word "exit" is illuminated on a dark background or the background may be translucent and the letters opaque so that the word "exit" appears dark on an illuminated background. Alternatively, the letters and background may be of translucent contrasting colours.

The sign 532 may comprise a separate, detachable insert and a set of interchangeable inserts provided with the word "exit" in different languages by means of which the light unit 501 can be adapted to meet the language requirements of different countries by selection and fitment of the appropriate insert.

Alternatively or additionally, inserts may be provided with other words or markings according to the position and use of the light unit 501. For example, where the light unit 501 is employed to identify an escape route along the aisles 518, 519, the insert may be provided with a picture such as a direction indicator (e.g. an arrow) for guiding passengers towards an exit 513, 514, 515, 516. A combination of a word and picture may be provided.

The inserts may clip into the housing. Alternatively, the sign 532 may be provided as part of a removable cover allowing fitment of different covers for changing the sign.

The light source 531 comprises a plurality of white LEDs 534. White LEDs 534 are used because of their low energy consumption and reliability. However, it will be understood that the light source 531 can be of any type including coloured LEDS, incandescent bulbs, fluorescent bulbs or otherwise. The LEDs 534 are mounted on a back wall 535 having a white surface to aid the emission of light. Suitable LEDs 534 comprise white LEDs (ex. CREE) having the following specification:

Forward Voltage 3.6V
Forward Current 20 mA (Peak 100 mA)
Power Dissipation 120 mW.

The battery 505 is positioned on the back wall 535 locally to the LEDs 534. In this embodiment, the battery 505 comprises a lithium battery having the following specification:

Lithium Sulphur Dioxide G36 'A' (ex.SAFT)
Open Circuit Voltage 3.0V
Max continuous current 1000 mA
Nominal capacity (drain) 1700 mAh (100 mA)

This provides sufficient capacity to operate the lighting system for 10 minutes (minimum) up to 20 minutes to meet current emergency lighting legislation for aircraft and allow for regular testing of the system over a period of time to ensure the system remains fully operational. The light unit 501 could include means (not shown) to provide a visual and/or audible warning of low battery power level requiring replacement of the battery 505.

The light unit 501 may be operable to carry out a "health" and "status" check in response to a test signal from the master control unit 502 and transmit a signal with its individual identification code or number to the master control unit 502 to indicate if the unit is operational. In this way, the master control unit 502 can monitor the "health" and "status" of all the light units 501 on the aircraft to determine if the lighting system meets the minimum equipment list (MEL) requirements for take-off (dispatch). For example, the master control unit 502 may generate a visual or audible signal on completion of a check to indicate if the lighting system has passed or failed, for example a green light for pass and a red light for fail.

Figure 6:
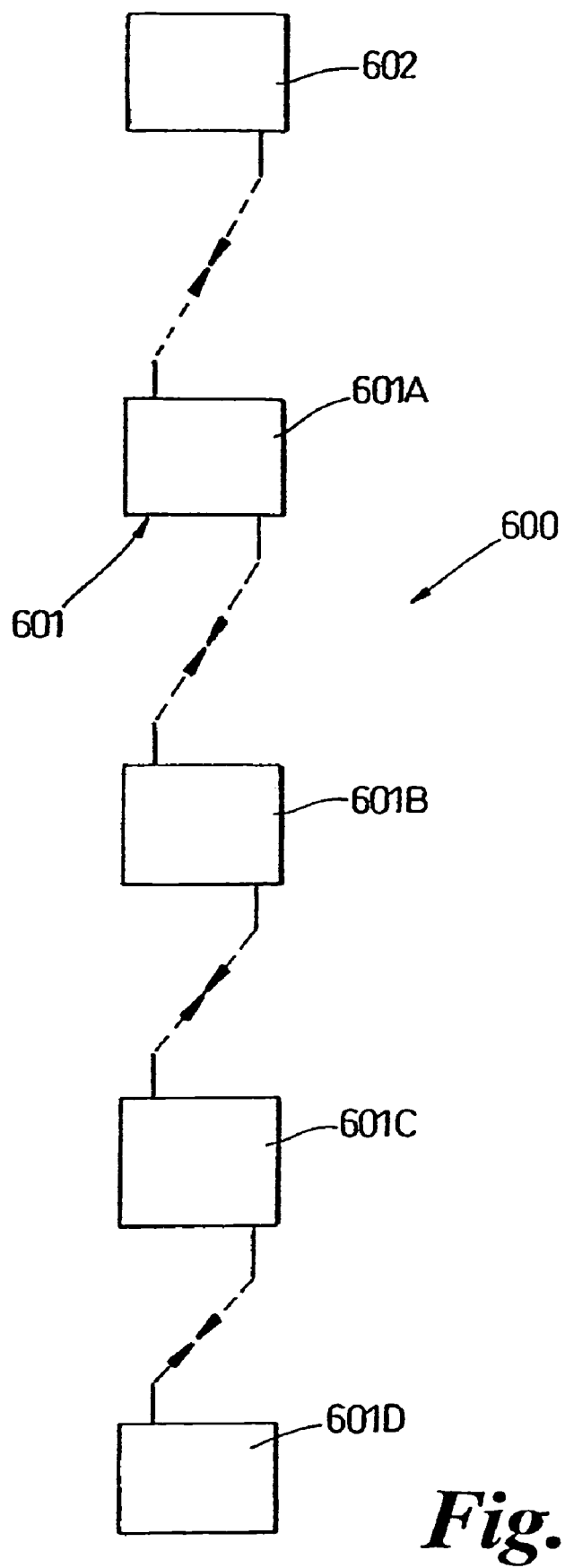
FIG. 6 shows a schematic of an emergency lighting system according to a second embodiment of the invention.

It will be understood that the invention is not limited to the embodiment above-described. For example FIG. 6 shows a second embodiment of a lighting system 600 according to the invention in which a plurality of units 601 (four only shown for convenience) are arranged at different locations in an aircraft, for example spaced apart along the length of the cabin, and are arranged to receive and re-transmit signals from the master control unit 602 and from other units 601. In this embodiment, however, the signals are cascaded in a sequential manner between the master control unit 602 and the first unit 601A, between the first unit 601A and the second unit 601B and so on to the last unit 601D.

Each unit 601 may include a light source and the system may operate in similar manner to switch the light sources on in response to a broadcast signal from the master control unit 602 cascaded between the light units 601. Alternatively or additionally, each unit 601 may act as a hub controlling a group of sub units that may be arranged as part of a lighting system, for example exit identifiers, aisle escape route markers etc.

This arrangement relies on each hub unit 601 receiving and re-transmitting the signal in sequence along the aircraft and could be prematurely terminated if one of the hubs is inoperable for any reason. To reduce the risk of such malfunction preventing operation of the lighting system when required, one or more additional (secondary) master control units may be provided at spaced locations within the aircraft. The additional (secondary) units may be activated automatically in response to activation of the main (primary) master control unit 602. Alternatively, the main (primary) and additional (secondary) control units may be arranged so that each unit is activated automatically in response to activation of any one of the units. Alternatively or additionally, the additional (secondary) units may be activated manually, for example by switches.

As will now be apparent from the foregoing description of exemplary embodiments, the present invention significantly reduces the amount of wiring required in an emergency lighting system.

In particular, wiring connections between individual light units and a remote power source are eliminated by providing each light unit with its own local power source and arranging for the light units to be operated by wireless transmission of a control signal using spread spectrum communication.

As a result, there are no wiring connections that can be broken in an accident to render the emergency lighting inoperable and individual light units will continue to operate even if the sections of the aircraft separate.

Furthermore, installation of the emergency lighting system in both new and existing aircraft is facilitated with potential cost savings by eliminating the wiring connections employed in conventional electrically powered systems.

Additionally, by allowing the light units to talk to each other and cascade signals broadcast from the master control unit and from other light units, a wide path diversity is provided for transmitting/receiving signals that significantly reduces or eliminates the chance of loss of communication. In particular, the light units may be arranged so that line of sight is always provided whatever path signals are transmitted/received between the units and the master control unit.

In this way, the emergency lighting system is not dependent on the aircraft configuration allowing the aircraft to be re-configured with different arrangements of seats, bulkheads, galleys, toilets, etc. As a result, the emergency lighting system has high utility and can be adapted for different aircraft configurations in a simple and effective manner.

Moreover, the emergency lighting system is reliable and essentially maintenance free over the operating life of the battery employed to power the light units offering further potential cost savings.

These advantages are of particular benefit for installation of the lighting system in an aircraft where reliability and safety requirements are very important. For example, an aircraft is grounded if the emergency lighting system is faulty and significant costs may be incurred for an operator if a take-off slot has to be vacated due to a fault in the emergency lighting.

As will be appreciated, the use of spread spectrum communication allows the lighting system to be utilised in aircraft where the spread spectrum radio signal is extremely unlikely to interfere with other electronic systems in the aircraft. This is an important characteristic feature of the invention as interference with other systems in the aircraft could cause the systems to malfunction. In extreme cases this could result in the plane crashing.

It will be appreciated that the above-described embodiments are intended to illustrate the diverse range and application of the invention to lighting systems that can be used in an emergency and that any feature described can be used separately or in combination with any other feature of the same or different embodiments to provide a lighting system having the benefits and advantages described herein.

It will also be understood that the invention is not limited to the above-described embodiments and that modifications and alterations can be made within the scope of the invention described herein. For example, the control signals could be transmitted using microwaves, infra-red light or some other form of electromagnetic radiation providing wireless communication.

The emergency lighting system may include light units on the outside of the aircraft. For example, external light units may be used to illuminate an escape chute for passengers to slide down from an exit when escaping the aircraft. The "health" and "status" of such external light units may be tested in similar manner to the light units within the aircraft to ensure these meet the MEL requirements for take-off.

Parts of the wireless emergency lighting system above-described may be combined with other emergency lighting systems to provide a hybrid system. For example, we may provide a hybrid system comprising wirelessly controlled light units as described above to indicate the exits (VEI's) and photoluminescent guide means mark an escape route to direct passengers to the exits. For example we may provide photoluminescent tracks at or near floor level along one or both sides of the aisles. The photoluminescent tracks may be of the type disclosed in our European patent No.0828657-B1 the contents of which are incorporated herein by reference.

Moreover, while the lighting system has been described with particular reference to aircraft, it will be appreciated that it could be employed in other situations where it is desired to assist evacuation in an emergency, for example in ships or trains or in buildings.

Furthermore, while the invention has particular application to emergency lighting systems in aircraft as described above, it will be understood that the invention is not limited to such use and that other safety functions within an aircraft may be switched on and off in similar manner using the same network. For example, signs capable of illumination such as no smoking signs, seat belt fastening signs, and exit signs may be switched on and off using spread spectrum communication.

Spread spectrum communication may also be used to control and/or monitor other equipment in the aircraft. For example smoke alarms at various locations in the aircraft may communicate with a master control unit using wireless spread spectrum communication to provide a warning if smoke is detected and identify the position of the smoke alarm that has been actuated. Similarly, wireless spread spectrum communication may be used to control drop down oxygen masks and provide an indication of deployment. Such other equipment may be registered to provide a unique identification allowing routine monitoring of the status (health) of each unit to be carried out in similar manner to the emergency lighting system previously described.

Other modifications and improvements will be apparent to those skilled in the art and are deemed within the scope of the invention.

The invention claimed is:

1. A system for a vehicle, said system comprising a plurality of networked communication devices arranged to communicate wirelessly with a master controller using spread spectrum communication to control operation of said devices and/or to provide information relating to the status of said devices, and wherein said devices are arranged to receive/transmit any signal so that signals to and from said master controller are cascaded between said devices in a random manner and wherein each device has its own battery power source and is arranged to cycle between an operable (awake) condition in which it can receive/transmit a signal and an inoperable (sleep) condition in which it does not receive/transmit a signal and said devices cycle between the operable and inoperable conditions in a random manner.

2. The system according to claim 1 wherein the cycle time is of the order of a few seconds.

3. The system according to claim 1 wherein each device can be switched between two cycle modes with different intervals between the operable and inoperable conditions.

4. The system according to claim 3 wherein stand-by and armed modes of operation are provided with said stand-by mode having a longer cycle time than said armed mode.

5. The system according to claim 1 wherein each device has a listening time in the awake condition of a few milliseconds.

6. The system according to claim 1 wherein each device is provided with a unique identification code and said master controller can transmit a polling signal that requires each device to transmit its unique identification code.

7. The system according to claim 6 wherein said identification codes are generated by an initialization signal during initial set-up of the system.

8. The system according to claim 1 wherein each device is operable in response to a test signal from said master controller to transmit a signal to indicate if the device is operational.

9. The system according to claim 1 wherein said master controller is operable to emit a signal centered on a single frequency.

10. The system according to claim 1 wherein said battery is replaceable, for example a lithium battery.

11. The system according to claim 1 wherein said battery is rechargeable.

12. The system according to claim 11 wherein each device includes a charging circuit to control operation of a photovoltaic cell to charge said battery if the charged level of the battery drops below a pre-determined limit.

13. The system according to claim 1 wherein each device provides a visual and/or audible warning of failure of said battery.

14. The system according to claim 1 wherein said networked devices comprise light units of an emergency lighting system.

15. The system according to claim 1 wherein at least two master controllers are provided for communicating with said networked devices using spread spectrum communication.

16. The system according to claim 15 wherein one of said master controllers is a primary controller and each additional master controller is a secondary controller operable automatically in response to activation of the primary controller.

17. In a passenger vehicle, a wireless emergency lighting system for guiding passengers to an exit, the system comprising a master controller and a plurality of battery operated light units arranged, when illuminated, to identify a route to said exit, each light unit being capable of receiving and transmitting a spread spectrum signal and being arranged to receive and retransmit any signal so that signals to and from said master controller are cascaded between said light units in a random manner, wherein each light unit is arranged to cycle between an operable (awake) condition in which it can receive and transmit a signal and an inoperable (sleep) condition in which it does not receive and transmit a signal, wherein said light units are arranged to cycle between said operable and inoperable conditions in a random manner.

18. The vehicle of claim 17 wherein said light units comprise at least one exit identifier placed at said exit to identify where said exit is.

19. The system according to claim 17 wherein said light units comprise escape path markers positioned at or near floor level along one or both sides of an aisle along which passengers can move to said exit.

20. A method of operating an emergency lighting system comprising providing a plurality of light units each capable of receiving and transmitting a spread spectrum signal, arranging said light units to receive/transmit any signal so that signals to and from a master controller are cascaded between said light units in a random manner, providing each light unit with its own battery power source, arranging each light unit to cycle between an operable (awake) condition in which it can receive/transmit a signal and an inoperable (sleep) condition in which it does not receive/transmit a signal, and arranging said light units to cycle between said operable and inoperable conditions in a random manner.

* * * * *